(12) United States Patent
Araki

(10) Patent No.: US 11,562,712 B2
(45) Date of Patent: Jan. 24, 2023

(54) VIDEO REPRODUCTION SYSTEM, VIDEO REPRODUCTION DEVICE, AND CALIBRATION METHOD FOR VIDEO REPRODUCTION SYSTEM

(71) Applicant: Sharp NEC Display Solutions, Ltd., Tokyo (JP)

(72) Inventor: Ryoichi Araki, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 17/278,606

(22) PCT Filed: Sep. 26, 2018

(86) PCT No.: PCT/JP2018/035794
§ 371 (c)(1),
(2) Date: Mar. 22, 2021

(87) PCT Pub. No.: WO2020/065792
PCT Pub. Date: Apr. 2, 2020

(65) Prior Publication Data
US 2021/0358451 A1    Nov. 18, 2021

(51) Int. Cl.
*G09G 5/02* (2006.01)
*G09G 5/10* (2006.01)
(Continued)

(52) U.S. Cl.
CPC ............. *G09G 5/02* (2013.01); *G09G 5/10* (2013.01); *G09G 2320/0666* (2013.01); *G09G 2320/0693* (2013.01); *G09G 2360/144* (2013.01)

(58) Field of Classification Search
USPC ........................................................ 345/589
See application file for complete search history.

(56) References Cited

U.S. PATENT DOCUMENTS 7,015,955 B2 * 3/2006 Funston ........... H04N 5/232939
348/333.02
2003/0147053 A1    8/2003 Matsuda et al.
(Continued)

FOREIGN PATENT DOCUMENTS

CN    104584115 A  *  4/2015  ........... G02B 27/017
EP    1 699 035 A1    9/2006
(Continued)

OTHER PUBLICATIONS

International Search Report (ISR) (PCT Form PCT/ISA/2010), in PCT/JP2018/035794, dated Dec. 25, 2018.

*Primary Examiner* — Wesner Sajous
(74) *Attorney, Agent, or Firm* — McGinn I.P. Law Group, PLLC.

(57) ABSTRACT

A video reproduction device includes a calibration image generator configured to generate calibration images to be displayed by a display and a display device; a receiver configured to receive, from an image capturing device, a captured image in which the calibration image displayed by the display and the calibration image displayed by the display device are captured or information generated on the basis of the captured image; a corrected data calculator configured to calculate color-component-corrected data from a color component difference between the calibration image displayed by the display and the calibration image displayed by the display device; and a second video signal output configured to perform color correction on a video signal representing the same video as the video signal that is output to the display according to the corrected data obtained by the corrected data calculator and output a color-corrected video signal to the display device.

20 Claims, 12 Drawing Sheets

(51) Int. Cl.
*G09G 5/30* (2006.01)
*H04N 1/60* (2006.01)
*H04N 5/202* (2006.01)
*H04N 5/57* (2006.01)
*H04N 9/64* (2006.01)
*H04N 9/77* (2006.01)
*H04N 9/69* (2006.01)

(56) References Cited

U.S. PATENT DOCUMENTS

| | | | |
|---|---|---|---|
| 2012/0014593 A1 | 1/2012 | Jaynes et al. | |
| 2013/0147860 A1* | 6/2013 | Ishida | G09G 5/10 |
| | | | 345/690 |
| 2018/0040307 A1* | 2/2018 | McLin | G09G 5/14 |
| 2020/0105182 A1* | 4/2020 | Koo | G09G 3/3625 |

FOREIGN PATENT DOCUMENTS

| | | | | | |
|---|---|---|---|---|---|
| JP | 2003-050572 A | | 2/2003 | | |
| JP | 2005-189542 A | | 7/2005 | | |
| JP | 2008-046536 A | | 2/2008 | | |
| JP | 2008046536 A | * | 2/2008 | ............ | G03B 21/00 |
| JP | 2010-521705 A | | 6/2010 | | |
| JP | 5185424 B1 | * | 4/2013 | ............... | G06T 7/80 |
| JP | 2014-204173 A | | 10/2014 | | |
| WO | WO 2008/115464 A1 | | 9/2008 | | |

* cited by examiner

FIG. 7

| R1 | R2 | R3 | R4 |
|----|----|----|----|
| G1 | G2 | G3 | G4 |
| B1 | B2 | B3 | B4 |
| W1 | W2 | W3 | W4 |

GRAYSCALE NUMBER  X1　　X2　　X3　　X4

FIG. 9A

| $R_{I1}$ | $R_{I2}$ | $R_{I3}$ | $R_{I4}$ |
|---|---|---|---|
| $G_{I1}$ | $G_{I2}$ | $G_{I3}$ | $G_{I4}$ |
| $B_{I1}$ | $B_{I2}$ | $B_{I3}$ | $B_{I4}$ |
| $W_{I1}$ | $W_{I2}$ | $W_{I3}$ | $W_{I4}$ |

FIG. 9B

| $R_{I1}$ | $R_{I2}$ | $R_{I3}$ | $R_{I4}$ |
|---|---|---|---|
| $G_{I1}$ | $G_{I2}$ | $G_{I3}$ | $G_{I4}$ |
| $B_{I1}$ | $B_{I2}$ | $B_{I3}$ | $B_{I4}$ |
| $W_{I1}$ | $W_{I2}$ | $W_{I3}$ | $W_{I4}$ |

| GRAYSCALE NUMBER | X1 | X2 | X3 | X4 |

FIG. 10A

| $R_{01}$ | $R_{02}$ | $R_{03}$ | $R_{04}$ |
|---|---|---|---|
| $G_{01}$ | $G_{02}$ | $G_{03}$ | $G_{04}$ |
| $B_{01}$ | $B_{02}$ | $B_{03}$ | $B_{04}$ |
| $W_{01}$ | $W_{02}$ | $W_{03}$ | $W_{04}$ |

FIG. 10B

| $R_{01}$ | $R_{02}$ | $R_{03}$ | $R_{04}$ |
|---|---|---|---|
| $G_{01}$ | $G_{02}$ | $G_{03}$ | $G_{04}$ |
| $B_{01}$ | $B_{02}$ | $B_{03}$ | $B_{04}$ |
| $W_{01}$ | $W_{02}$ | $W_{03}$ | $W_{04}$ |

GRAYSCALE NUMBER: X1  X2  X3  X4

VIDEO REPRODUCTION SYSTEM, VIDEO REPRODUCTION DEVICE, AND CALIBRATION METHOD FOR VIDEO REPRODUCTION SYSTEM

TECHNICAL FIELD

The present invention relates to a video reproduction system, a video reproduction device, and a calibration method for the video reproduction system.

BACKGROUND ART

A personal computer (PC) owned by an operator may be connected to a video display device (a projector or a display) and a video of the PC may be displayed on a screen of the projector or the display. In this case, a color of a video displayed on the screen may be different from a color of a display screen of the PC intended by the operator according to a type of the screen of a main body of the video display device or the projector and ambient light.

In Patent Literature 1, technology for capturing an image on a screen of a projector with an image sensor and calibrating the hue or brightness of an image on the basis of an image capturing result is proposed.

Also, in Patent Literature 2, technology for simultaneously capturing a calibration image displayed on a screen by a projector and a calibration image displayed on a screen of a PC with an image sensor embedded in the projector and performing color correction on an image to be projected is proposed.

CITATION LIST

Patent Literature

[Patent Literature 1]

Japanese Unexamined Patent Application, First Publication No. 2003-50572

[Patent Literature 2]

Japanese Unexamined Patent Application, First Publication No. 2008-46536

SUMMARY OF INVENTION

Technical Problem

In Patent Literature 1, the image on the screen of the projector is captured with the image sensor and the hue or brightness of the image is calibrated on the basis of the image capturing result. However, the display of the image by the PC is not necessarily calibrated and the color intended by the operator on the screen of the PC is not a color which is theoretically set. Therefore, the technology of Patent Literature 1 has a problem that there is a gap between a color of an image produced by the PC, which is not calibrated to the theoretical color, and an apparent color of an image on the screen calibrated to the theoretical color.

In Patent Literature 2, the calibration image displayed on the screen by the projector and the calibration image displayed on the screen of the PC are simultaneously captured by the image sensor embedded in the projector and color correction on the image to be projected is performed. However, Patent Literature 2 has a problem that a special projector having a built-in image sensor is required for calibration and it is difficult to use it in a general-purpose projector.

In view of the above-described problems, an objective of the present invention is to provide a video reproduction system, a video reproduction device, and a calibration method for the video reproduction system capable of adjusting a color of a display video of a video display device to a color of a display device of a video reproduction device desired by an operator quickly and simply without using a device having a special function when the video reproduction device having the display device is connected to the video display device.

Solution to Problem

A video reproduction system according to one aspect of the present invention includes at least: a video reproduction device; and a display device connected to the video reproduction device, wherein the video reproduction device includes: a display; a calibration image generator configured to generate calibration images to be displayed by the display and the display device; a receiver configured to receive a captured image in which the calibration image displayed by the display and the calibration image displayed by the display device are captured or information generated on the basis of the captured image; a corrected data calculator configured to calculate color-component-corrected data from a color component difference between the calibration image displayed by the display and the calibration image displayed by the display device; a first video signal output configured to output a video signal to the display; and a second video signal output configured to perform color correction on a video signal representing the same video as the video signal that is output to the display according to the corrected data obtained by the corrected data calculator and output a color-corrected video signal to the display device, and wherein the display device displays a video based on the color-corrected video signal.

A video reproduction system according to one aspect of the present invention includes at least: a video reproduction device; a first display device; and a second display device, wherein the video reproduction device includes: a calibration image generator configured to generate calibration images to be displayed by the first display device and the second display device; a receiver configured to receive a captured image in which the calibration image displayed by the first display device and the calibration image displayed by the second display device are captured or information generated on the basis of the captured image; a corrected data calculator configured to calculate color-component-corrected data from a color component difference between the calibration image displayed by the first display device and the calibration image displayed by the second display device; a first video signal output configured to output a video signal to the first display device; and a second video signal output configured to perform color correction on a video signal representing the same video as the video signal that is output to the first display device according to the corrected data obtained by the corrected data calculator and output a color-corrected video signal to the second display device, and wherein the second display device displays a video based on the color-corrected video signal.

A video reproduction device, according to one aspect of the present invention, for use in a video reproduction system includes: at least the video reproduction device and a display device connected to the video reproduction device, the video reproduction device including: a display; a calibration image generator configured to generate calibration images to be displayed by the display and the display device connected outside of the video reproduction device; a receiver configured to receive a captured image in which the calibration image displayed by the display and the calibration image displayed by the display device are captured or information generated on the basis of the captured image from an image capturing device; a corrected data calculator configured to calculate color-component-corrected data from a color component difference between the calibration image displayed by the display and the calibration image displayed by the display device included in the captured image; a first video signal output configured to output a target video signal to be reproduced to the display; and a second video signal output configured to perform color correction on the video signal to be output from the first video signal output to the display according to the corrected data obtained by the corrected data calculator and output a color-corrected video signal to the display device, wherein the display device displays a video based on the color-corrected video signal.

An image capturing device, according to one aspect of the present invention, capable of being used in a video reproduction system includes at least a video reproduction device and a display device connected to the video reproduction device, the image capturing device including: an image capturer configured to perform image capturing in an image capturing range including at least a calibration image displayed by a display provided in the video reproduction device and a calibration image displayed by the display device; and a transmitter configured to transmit a captured image to the video reproduction device that outputs a video signal to the display and outputs a video signal corrected according to corrected data based on a color component difference between the calibration image displayed by the display and the calibration image displayed by the display device to the display device.

A calibration method, according to one aspect of the present invention, for use in a video reproduction device in a video reproduction system includes at least the video reproduction device and a display device connected to the video reproduction device, the calibration method including: generating, by the video reproduction device, calibration images to be displayed by the display provided in the video reproduction device and the display device; receiving, by the video reproduction device, a captured image in which the calibration image displayed by the display and the calibration image displayed by the display device are captured or information generated on the basis of the captured image from an image capturing device; calculating, by the video reproduction device, color-component-corrected data from a color component difference between the calibration image displayed by the display and the calibration image displayed by the display device; outputting a video signal to the display; performing, by the video reproduction device, color correction on a video signal representing the same video as the video signal that is output to the display according to the corrected data obtained by the corrected data calculator and outputting a color-corrected video signal to the display device, and displaying, by the display device, a video based on the color-corrected video signal.

A captured image supply method, according to one aspect of the present invention, for use in an image capturing device capable of being used in a video reproduction system includes at least a video reproduction device and a display device connected to the video reproduction device, the captured image supply method including: generating a captured image by performing image capturing in an image capturing range including at least a calibration image displayed by a display provided in the video reproduction device and a calibration image displayed by the display device; and transmitting the captured image to the video reproduction device that outputs a video signal to the display and outputs a video signal corrected according to corrected data based on a color component difference between the calibration image displayed by the display and the calibration image displayed by the display device to the display device.

Advantageous Effects of Invention

According to the present invention, a calibration operation can be performed by causing the first display device and the second display device to display calibration images, simultaneously capturing the two calibration images, and transmitting the calibration images to the video reproduction device. Thereby, it is possible to correct a display color difference between a video displayed on the first display device and a video displayed on the second display device. According to the present invention, it is possible to adjust a color of a display video of a video display device to a color of a display device of a video reproduction device desired by an operator quickly and simply without using a device having a special function.

BRIEF DESCRIPTION OF DRAWINGS

FIG. 7 is a diagram showing an example of a calibration image.

FIG. 9A is an explanatory diagram of a geometric process on a calibration image displayed on a display device.

FIG. 9B is an explanatory diagram of a geometric process on a calibration image displayed on the display device.

FIG. 10A is an explanatory diagram of geometric correction of a calibration image displayed on a screen.

FIG. 10B is an explanatory diagram of geometric correction of a calibration image displayed on the screen.

DESCRIPTION OF EMBODIMENTS

Figure 1:
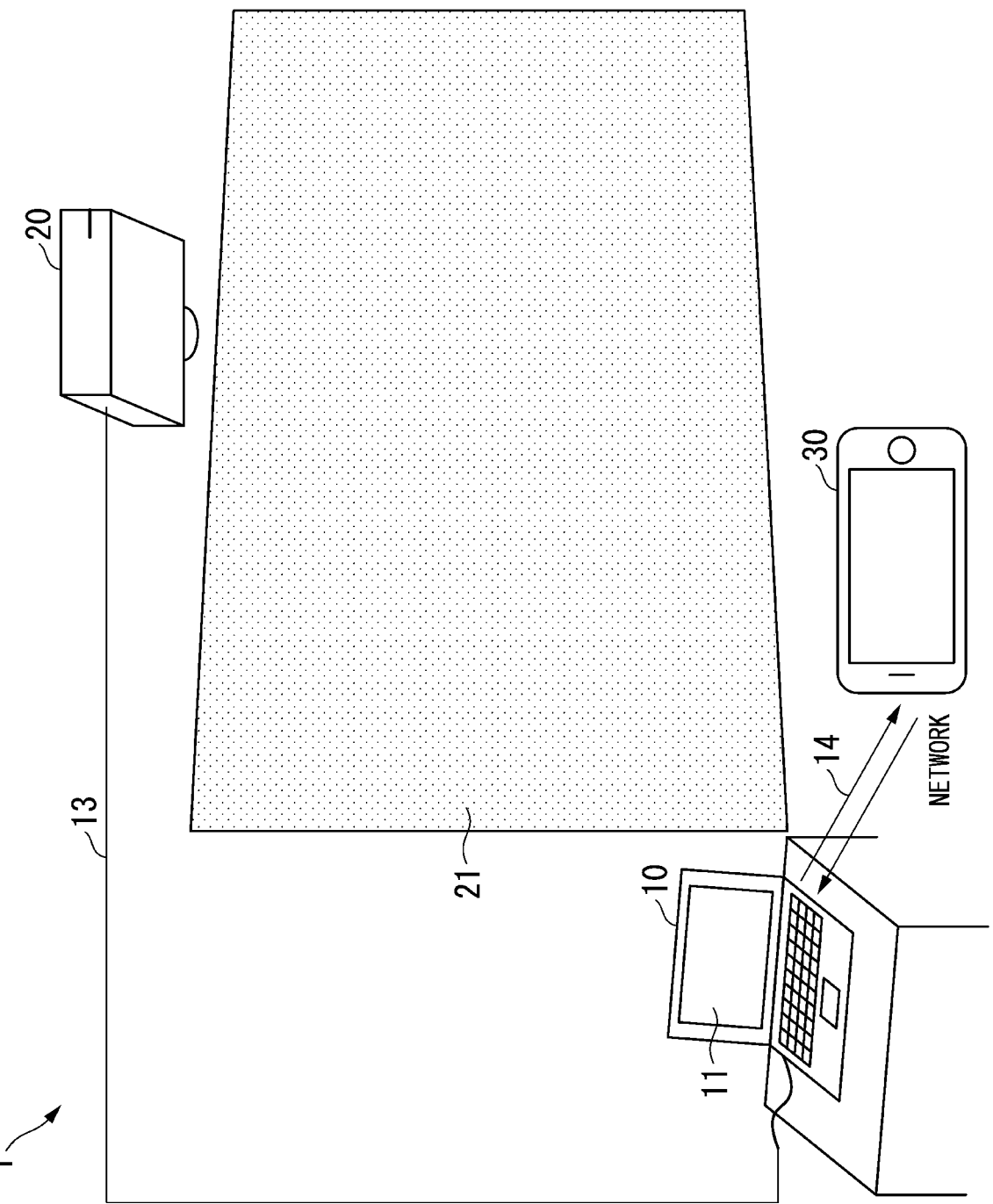
FIG. 1 is a diagram showing a schematic configuration of a video reproduction system according to a first embodiment of the present invention.

Hereinafter, embodiments of the present invention will be described with reference to the drawings. FIG. 1 is a diagram showing a schematic configuration of a video reproduction system 1 according to a first embodiment of the present invention. As shown in FIG. 1, the video reproduction system 1 according to the present embodiment includes a video reproduction device 10 having a display device 11 (a first display device), a video display device 20 (a second display device), and an image capturing device 30.

The video reproduction device 10 is, for example, a personal computer (PC). The video reproduction device 10 has the display device 11 and reproduces and outputs video data. When the video reproduction device 10 is a notebook PC, the display device 11 is, for example, a liquid crystal display attached to the notebook PC. Also, the display device 11 may be an external display. Also, the video reproduction device 10 is not limited to a PC, and for example, a tablet terminal or the like, may be used.

The video display device 20 is, for example, a projector. The video display device 20 displays a video reproduced from the video reproduction device 10 on a large screen. In the present example, the video display device 20 projects a video onto a screen 21 to display the video. Also, the video display device 20 is not limited to the projector and may be another display device such as a liquid crystal display.

In the present embodiment, the video reproduction device 10 and the video display device 20 are connected via a video cable 13. The video signal from the video reproduction device 10 is supplied to the video display device 20 via the video cable 13. Thereby, a video similar to that of the display device 11 of the video reproduction device 10 can be displayed on the screen 21 of the video display device 20.

The image capturing device 30 is, for example, a portable terminal with a camera (referred to as a smartphone). The video reproduction device 10 and the image capturing device 30 are connected via the network 14. The network 14 can be constructed by a router and a wireless local area network (LAN) or a wired LAN.

The image capturing device 30 is used when a calibration operation is performed. Here, the calibration operation adjusts a display color difference between a video displayed on the display device 11 of the video reproduction device 10 and a video displayed on the screen 21 of the video display device 20. When the calibration operation is performed, calibration images are displayed on the display device 11 of the video reproduction device 10 and the screen 21 of the video display device 20. The calibration images are images having a plurality of colors and including images having different grayscales for each color. For example, the calibration images are images having red (R), green (G), blue (B), and white (W) and arranged in descending or ascending order of concentrations for each of these colors. The operator uses the image capturing device 30 to simultaneously capture the calibration image of the display device 11 and the calibration image of the screen 21 and transmits the captured images to the video reproduction device 10. The video reproduction device 10 extracts images captured from the two calibration images, which are an image captured from the calibration image of the display device 11 and an image captured from the calibration image of the screen 21, from the captured images transmitted from the image capturing device 30. The video reproduction device 10 geometrically corrects the images captured from the two calibration images, extracts signals of each color, obtains tone curves, and generates corrected data of each color. Also, the image capturing device 30 is not limited to the portable terminal with a camera, and any device that can capture a calibration image and has a function of transmitting the captured image to the video reproduction device 10 can be used as the image capturing device 30. As the image capturing device 30, for example, a digital camera with a communication function may be used.

Figure 2:
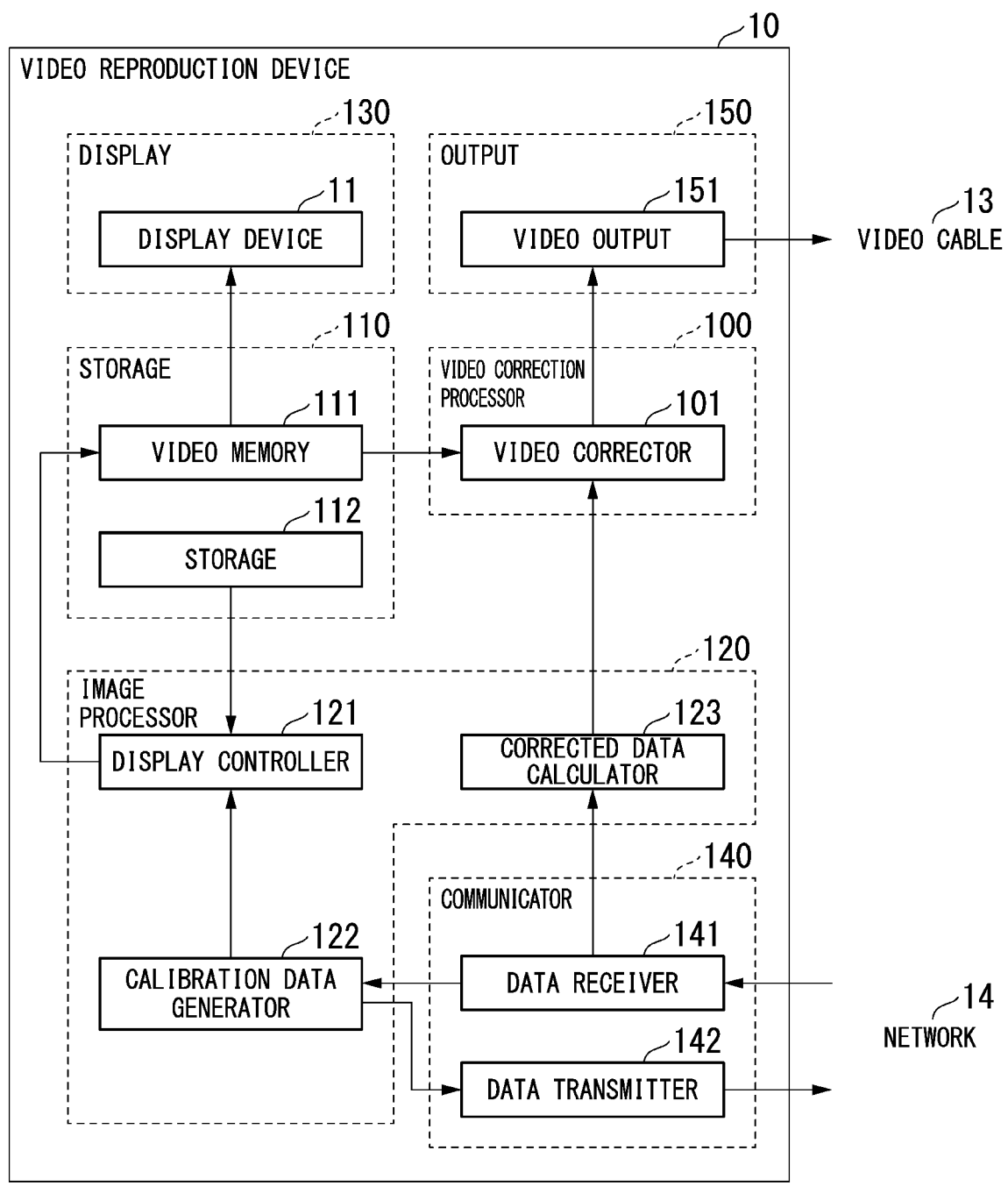
FIG. 2 is a block diagram based on a function of a video reproduction device.

FIG. 2 is a block diagram based on a function of the video reproduction device 10 according to the embodiment of the present invention.

As shown in FIG. 2, the video reproduction device 10 includes a video processor 100, a storage 110, an image processing controller 120, a display 130, a communicator 140, and an output 150.

The video processor 100 is a part that performs various types of processes on video data. The video processor 100 includes a video corrector 101. The video corrector 101 performs color correction on a video signal which is output to the video display device 20 on the basis of corrected data calculated by the corrected data calculator 123.

The storage 110 is a part that stores/reproduces data with a read only memory (ROM), a random access memory (RAM), a hard disk drive (HDD), a solid state drive (SSD), or the like. The storage 110 includes a video memory 111 and a storage 112. The video memory 111 is a memory that loads and stores a video to be displayed. Various types of programs and data are stored in the storage 112. Video data to be reproduced from the video reproduction device 10 is stored in the storage 112.

The image processing controller 120 is a part that performs image processing. The image processing controller 120 includes a display controller 121, a calibration data generator 122, and a corrected data calculator 123. The display controller 121 generates displayable video data from video data in the storage 112 and writes the displayable video data to the video memory 111. In a general computer, this process is performed using a drawing function of the operating system (OS). The calibration data generator 122 generates a calibration image. The corrected data calculator 123 generates corrected data from the image captured from the calibration image. The calculation of the corrected data will be described below.

The display 130 includes a display device 11. As described above, when the video reproduction device 10 is a notebook PC, the display device 11 is, for example, a liquid crystal display attached to the notebook PC.

The communicator 140 is a part that communicates with an external device. The communicator 140 includes a data receiver 141 and a data transmitter 142. The communicator 140 performs data communication through, for example, a wireless LAN or a wired LAN. Also, a cellular circuit of 3G, 4G, or the like may be used as the communicator 140.

The output 150 is a part that outputs a video signal. The output 150 includes a video output 151. As the video output 151, an RGB port, a video graphics array (VGA), a high-definition multimedia interface (HDMI (registered trademark)), a digital visual interface (DVI), a display port, and the like are used. The video cable 13 is connected to the video output 151. In the present embodiment, the video signal from the video reproduction device 10 is output from the video output 151 to the video display device 20 via the video cable 13.

Figure 3:
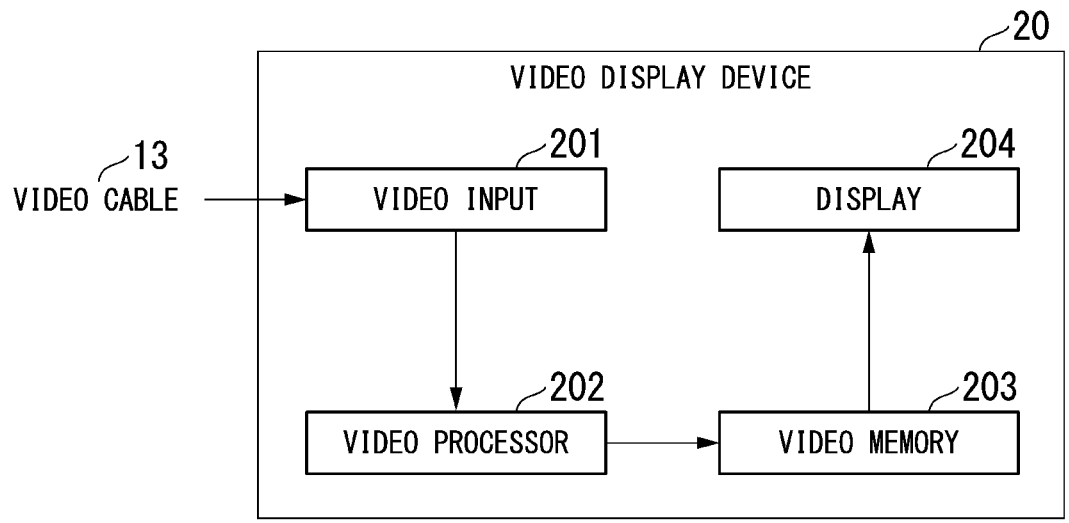
FIG. 3 is a block diagram based on a function of a configuration of a video display device.

FIG. 3 is a block diagram based on a function of a configuration of the video display device 20 according to the embodiment of the present invention.

As shown in FIG. 3, the video display device 20 includes a video input 201, a video processor 202, a video memory 203, and a display 204.

The video input 201 inputs a video signal from the video reproduction device 10. As the video input 201, an RGB port, a VGA, an HDMI, a DVI, a display port, and the like are used. The video cable 13 is connected to the video input 201.

The video processor 202 processes a video to be displayed. The video memory 203 is a memory that loads and stores the video to be displayed.

The display 204 projects a display image onto the screen 21 to display the display image. The display 204 includes an optical system that projects an image onto the screen 21. Also, a liquid crystal projection scheme or a DLP (registered trademark) scheme may be used as a projection scheme.

Figure 4:
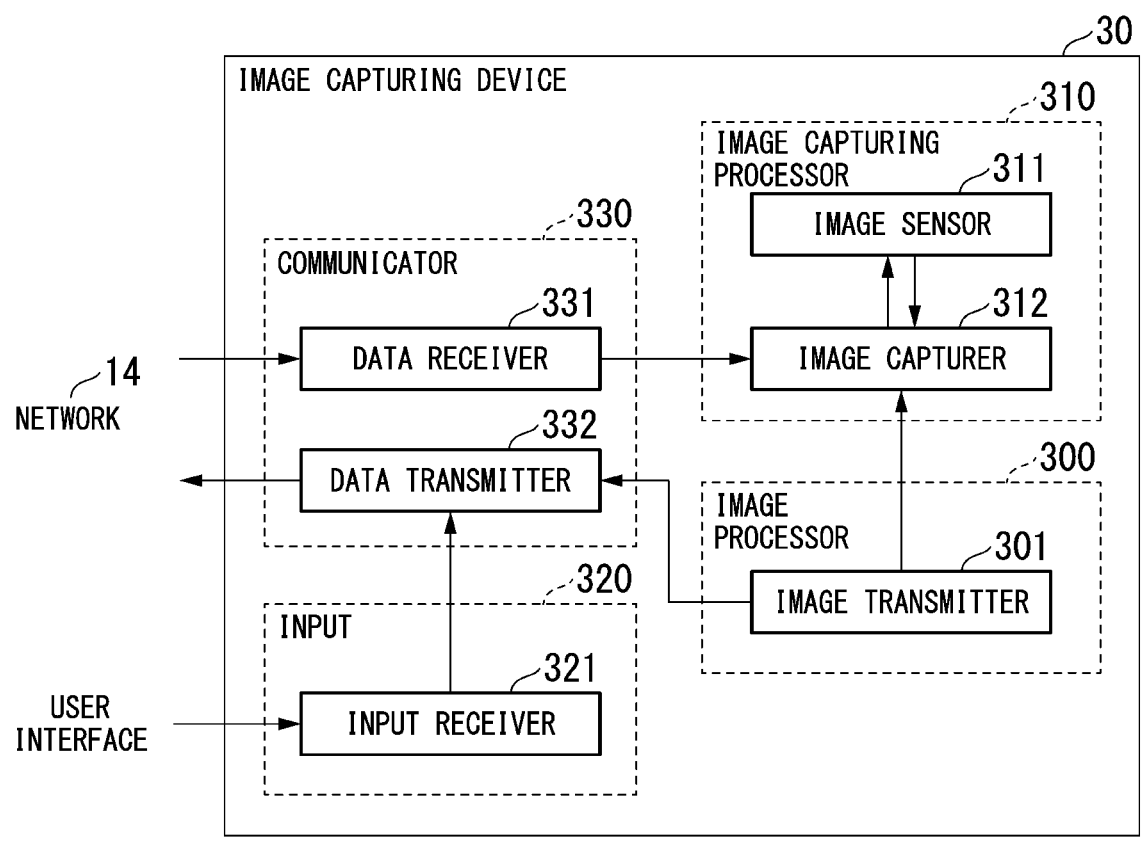
FIG. 4 is a block diagram based on a function of a configuration of an image capturing device.

FIG. 4 is a block diagram based on a function of a configuration of the image capturing device 30 according to the embodiment of the present invention.

As shown in FIG. 4, the image capturing device 30 includes an image processor 300, an image capturing processor 310, an input 320, and a communicator 330.

The image processor 300 includes an image transmittter 301. The image transmitter 301 performs a process of transmitting a captured image captured from a calibration image by the image capturing processor 310 from the communicator 330 to the video reproduction device 10.

The image capturing processor 310 is a part that implements a camera function. The image capturing processor 310 includes an image sensor 311 and an image capturer 312. The image sensor 311 is an image capturing element such as a charge-coupled device (CCD) or a complementary MOS (CMOS). The image capturer 312 controls the image capturing process of the image sensor 311.

The input 320 is a part that receives an input operation of the operator. The input 320 includes an input receiver 321. When the image capturing device 30 is a portable terminal with a camera, the input 320 includes a touch panel.

The communicator 330 is a part that communicates with an external device. The communicator 330 includes a data receiver 331 and a data transmitter 332. The communicator 330 performs data communication through, for example, a wireless LAN or a cellular circuit of 3G, 4G, or the like.

Figure 5:
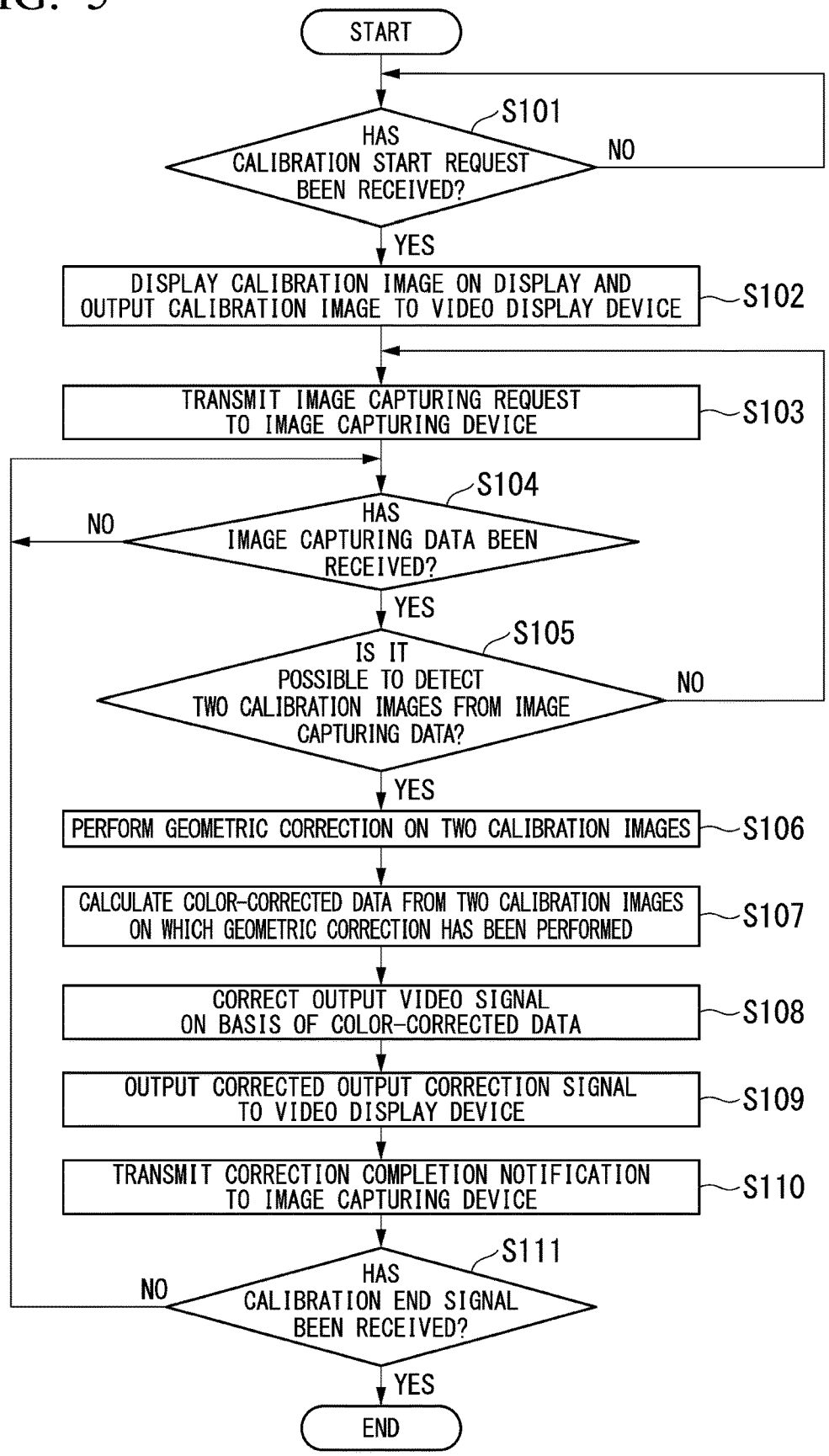
FIG. 5 is a flowchart showing a calibration operation of the video reproduction device.

Next, a calibration operation in the video reproduction system 1 according to the embodiment of the present invention will be described in detail. FIG. 5 is a flowchart showing a calibration operation of the video reproduction device 10 according to the embodiment of the present invention and FIG. 6 is a flowchart showing a calibration operation of the image capturing device 30 according to the embodiment of the present invention.

Figure 6:
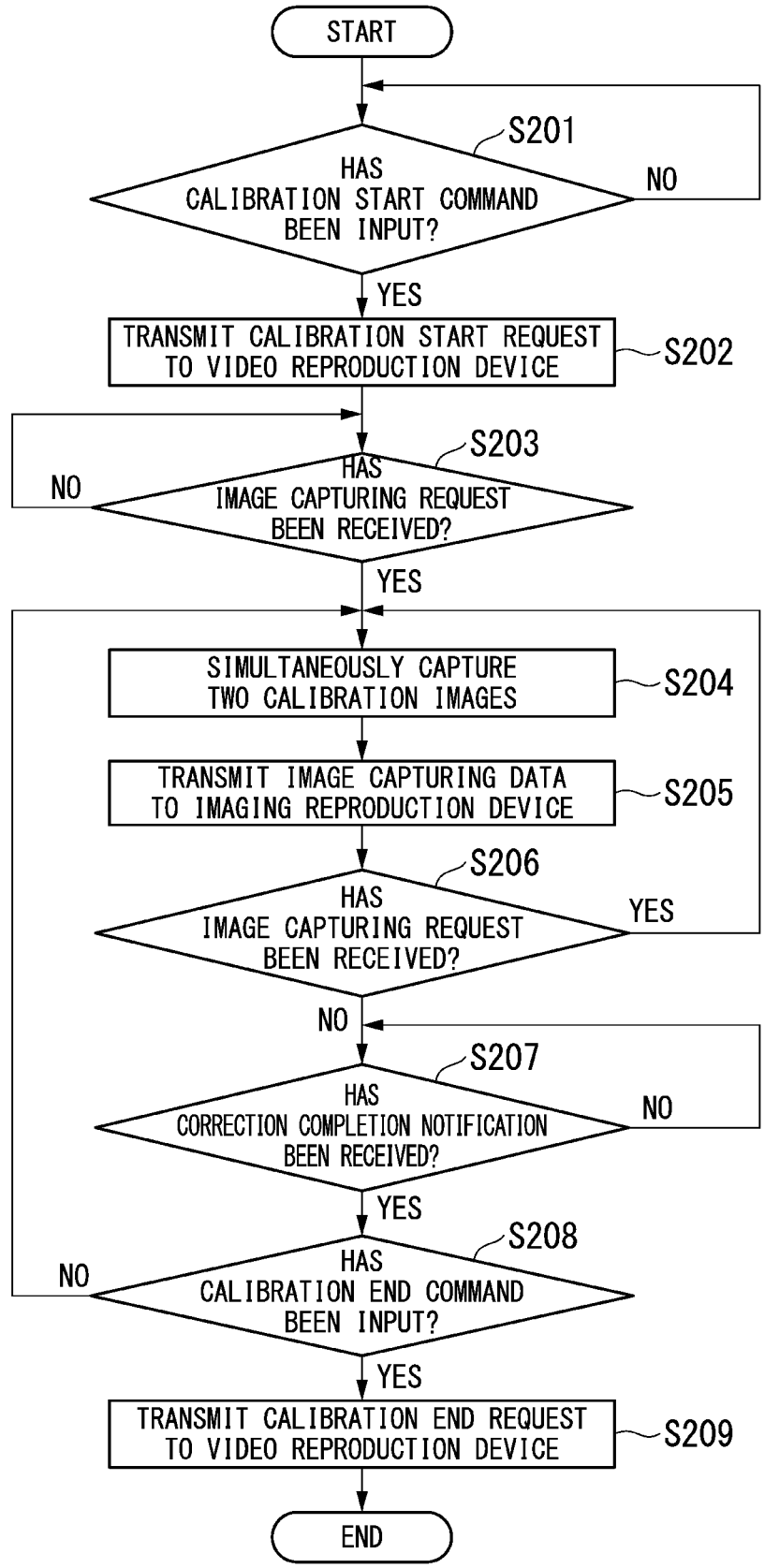
FIG. 6 is a flowchart showing a calibration operation of the image capturing device.

(Step S201) In FIG. 6, when the calibration operation starts, the operator inputs a calibration start command to the input 320 of the image capturing device 30. The image capturing device 30 determines whether or not the calibration start command has been input. When the image capturing device 30 detects the input of the calibration start command (step S201: Yes), the process proceeds to step S202.

(Step S202) The image capturing device 30 transmits a calibration start request to the video reproduction device 10. This calibration start request is transmitted from the data transmitter 332 of the image capturing device 30 to the video reproduction device 10 via the network 14.

(Step S101) In FIG. 5, the video reproduction device 10 is waiting for a calibration start request to be transmitted from the image capturing device 30. When the video reproduction device 10 receives the calibration start request from the image capturing device 30 (step S101: Yes), the process proceeds to step S102. If the calibration start request can be acquired, the calibration start request can be acquired using another method than a method of receiving the calibration start request from the image capturing device 30. For example, the calibration start request may be acquired from an input by the user via an input device provided in the video reproduction device 10. As the input device, any one or more of a keyboard, a touch panel, a mouse, and the like provided in the video reproduction device 10 can be used. For example, a menu screen of the video reproduction device 10 is opened by inputting an operation using the input device and the calibration start request is acquired by clicking a button for executing the calibration start request from the menu or the like. In this case, an image indicating that the calibration start request has been made may be displayed on the display 130 of the video reproduction device 10, the presence of the calibration start request may be displayed in the video display device 20 through transmission from the output 150 to the video display device 20, or a notification of information indicating the presence of the calibration start request may be provided from the communicator 140 of the video reproduction device 10 to the image capturing device 30.

(Step S102) In response to the calibration start request from the image capturing device 30, the video reproduction device 10 switches a currently reproduced video to a calibration image from the calibration data generator 122. The video reproduction device 10 causes calibration images to be displayed on the display device 11 of the video reproduction device 10 and the screen 21 of the video display device 20.

(Step S103) When the calibration images are displayed on the display device 11 and the screen 21, the video reproduction device 10 transmits an image capturing request to the image capturing device 30.

(Step S203) In FIG. 6, the image capturing device 30 is waiting for an image capturing request to be transmitted from the video reproduction device 10. When the image capturing device 30 receives the image capturing request from the video reproduction device 10 (step S203: Yes), the process proceeds to step S204.

(Step S204) The operator uses the camera function of the image capturing device 30 to perform image capturing so that two calibration images of a calibration image displayed on the display device 11 of the video reproduction device 10 and a calibration image displayed on the screen 21 of the video display device 20 are within one image capturing region. For example, the two calibration images of the calibration image displayed on the display device 11 and the calibration image displayed on the screen 21 are simultaneously captured so that they are within one screen such as a liquid crystal display device provided in the image capturing device 30. When these two calibration images are captured within one image capturing region, it is possible to obtain an image in which an influence of a change in ambient light due to the passage of time is reduced. The calibration image displayed on the display device 11 and the calibration image displayed on the screen 21 may be separately captured and the obtained captured images may be used as a set of captured images. Even if the display screen of the display device 11 and the display screen of the screen 21 are separated to some extent and do not fit in an angle of view of the image capturing device 30 when these two calibration images are captured separately, calibration images can be obtained.

(Step S205) When a process of capturing the two calibration images ends, the image capturing device 30 transmits an image captured from the calibration images to the video reproduction device 10.

Here, data of one captured image may be transmitted when an image is captured as one image including the calibration image displayed on the display device 11 and the calibration image displayed on the screen 21 and captured images may be transmitted when the calibration image displayed on the display device 11 and the calibration image displayed on the screen 21 are captured as separate images.

(Step S104) In FIG. 5, the video reproduction device 10 is waiting for image capturing data to be transmitted from the image capturing device 30. When the video reproduction device 10 receives the image capturing data from the image capturing device 30 (step S104: Yes), the process proceeds to step S105.

(Step S105) The video reproduction device 10 determines whether or not two calibration images can be detected from the image capturing data transmitted from the image capturing device 30. The video reproduction device 10 moves the process to step S106 if the two calibration images can be detected (step S105: Yes) and returns the process to step S103 if the two calibration images cannot be detected (step S105: No).

When the two calibration images cannot be detected from the image capturing data transmitted from the image capturing device 30 (step S105: No), the image capturing request is retransmitted to the image capturing device 30 in step S103. In the image capturing device 30 of FIG. 6, it is determined that the image capturing request has been received in step S206, the calibration image is recaptured by the image capturing device 30 in step S203, and the captured image is retransmitted from the image capturing device 30 to the video reproduction device 10 in step S205.

(Step S106) In FIG. 5, the video reproduction device 10 extracts images captured from the two calibration images from the image capturing data transmitted from the image capturing device 30 and performs geometric correction on the images captured from the two calibration images so that the captured images have an aspect ratio of an original calibration image.

(Step S107) The video reproduction device 10 extracts color components for each color and each grayscale region from images captured from two geometrically corrected calibration images and calculates color-corrected data. When the color-corrected data is calculated, the corrected data calculator 123 transmits the obtained corrected data to the video corrector 101 and moves the process to step S108.

(Step S108) The video reproduction device 10 corrects the video signal transmitted to the video display device 20 on the basis of the corrected data transmitted from the corrected data calculator 123. A target video signal to be corrected here is a video signal indicating the same video as a video signal which is output to the display 130 of the video reproduction device 10 and is a video signal which is output from the output 150.

(Step S109) The video reproduction device 10 outputs the corrected video signal to the video display device 20. Thereby, a display color difference between the video which is displayed on the display device 11 of the video reproduction device 10 and the video which is displayed on the screen 21 of the video display device 20 is corrected.

(Step S110) The video reproduction device 10 transmits a correction completion notification to the image capturing device 30.

(Step S207) In FIG. 6, the image capturing device 30 is waiting for the correction completion notification from the video reproduction device 10. When the correction completion notification is received from the video reproduction device 10 (step S207: Yes), the image capturing device 30 moves the process to step S208.

(Step S208) When a calibration operation ends, the operator inputs a calibration end command The image capturing device 30 waits for the input of the calibration end command (Step S209) When the operator inputs the calibration end command (step S208: Yes), the image capturing device 30 transmits a calibration end request to the video reproduction device 10 to end the process.

(Step S111) In FIG. 5, the video reproduction device 10 is waiting for a calibration end request from the image capturing device 30. When the calibration end request is received from the image capturing device 30, the video reproduction device 10 hides the calibration image, displays the original image, and ends the process.

After the calibration ends, the video corrector 101 successively continue to correct the color of the video signal that is output to the video display device 20 on the basis of the color-corrected data calculated by the corrected data calculator 123 in the video reproduction device 10. Thereby, the video display device 20 displays a video on the basis of a color-corrected video signal. As a result, a color of a display video of the screen 21 of the video display device 20 is adjusted to a color of a display video of the display device 11.

Also, although the process ends by inputting the calibration end command of the operator in the above process, a process of capturing the calibration image to perform correction may be automatically iterated until a color difference between the color of the display video of the display device 11 and the color of the display video of the screen 21 of the video display device 20 is less than or equal to a predetermined value.

As described above, in the present embodiment, the calibration images are displayed on the display device 11 of the video reproduction device 10 and the screen 21 of the video display device 20 and the image capturing device 30 simultaneously captures the two calibration images. The corrected data calculator 123 of the video reproduction device 10 uses the two calibration images to generate corrected data. The processing at this time will be further described.

When the calibration start request from the image capturing device 30 is received in step S101, the video reproduction device 10 transmits the calibration image from the calibration data generator 122 to both the display device 11 and the video display device 20 in step S102. Thereby, the calibration image is displayed on the display device 11 and the calibration image is displayed on the screen 21 of the video display device 20.

FIG. 7 shows an example of a calibration image in the present embodiment. As shown in FIG. 7, a calibration image is an image in which color images of red (R), green (G), blue (B), and white (W) are arranged so that the grayscale changes sequentially. In FIG. 7, the top row becomes a red region. In the red region, red colors R1, R2, R3, and R4 are arranged in grayscale numbers X1, X2, X3, and X4 in the horizontal direction so that a red grayscale sequentially increases. The next row is a green region. In the green region, green colors G1, G2, G3, and G4 are arranged in the grayscale numbers X1, X2, X3, and X4 in the horizontal direction so that the green grayscale sequentially increases. The next row is a blue region. In the blue region, blue colors B1, B2, B3, and B4 are arranged in the grayscale numbers X1, X2, X3, and X4 in the horizontal direction so that the blue grayscale sequentially increases. The bottom row is a white region. In the white region, white colors W1, W2, W3, and W4 are arranged in the grayscale numbers X1, X2, X3, and X4 in the horizontal direction so that the white grayscale sequentially increases. Also, although the number of grayscales is set to "4" in the present example, a larger number of grayscales may be set.

Figure 8:
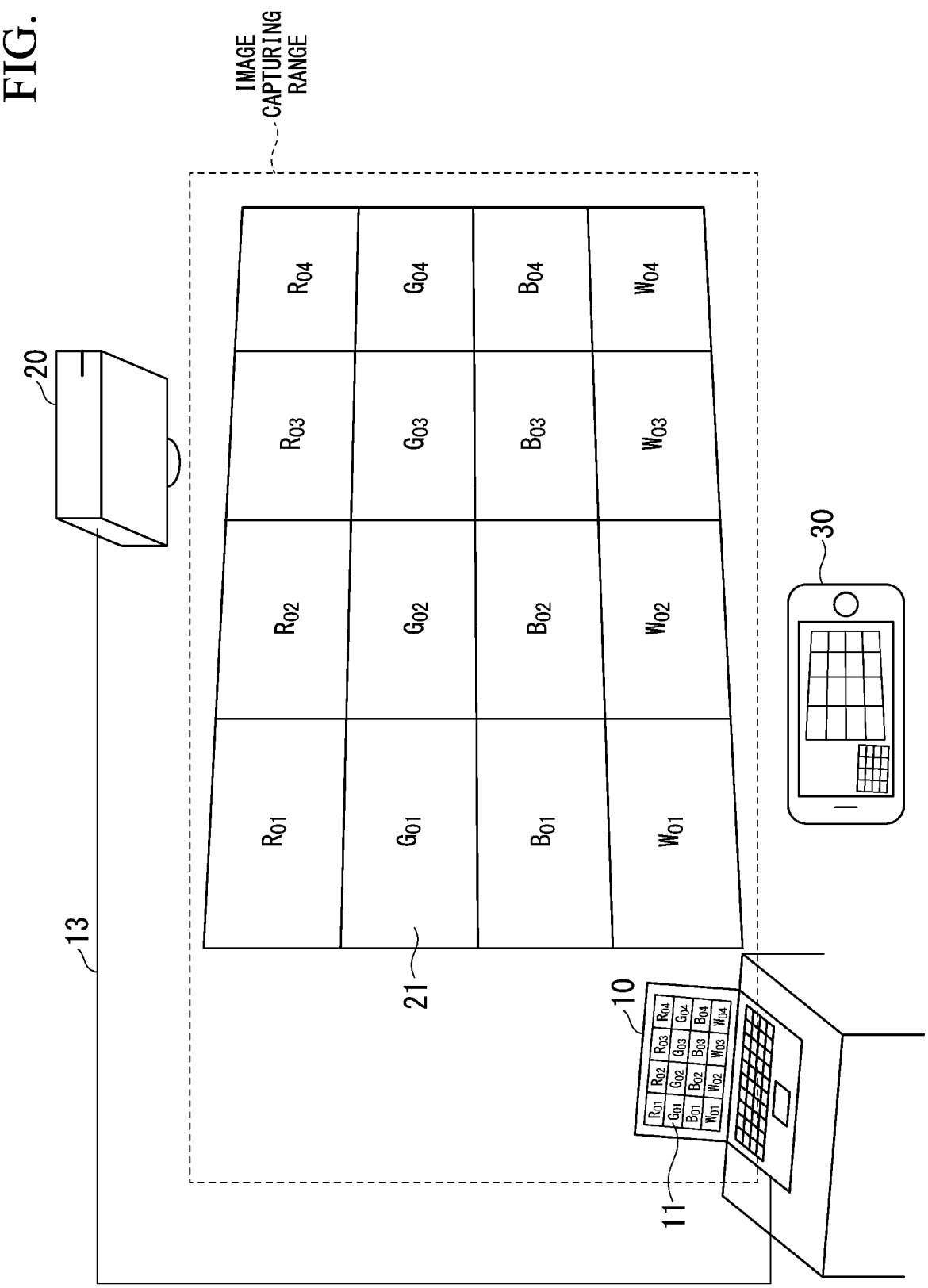
FIG. 8 is a diagram showing an image capturing region of the calibration image.

When the calibration images are displayed on the display device 11 and the screen 21, the operator simultaneously captures the two calibration images as one image using the image capturing device 30 in step S204. That is, FIG. 8 shows an image capturing region of the calibration image according to the present embodiment. As shown in FIG. 8, the operator sets the arrangement of each device and captures calibration images so that there is provided an image capturing range in which the calibration image of the display device 11 and the calibration image of the screen 21 of the video display device 20 are simultaneously included in one image. This calibration images are transmitted from the image capturing device 30 to the video reproduction device 10 in step S205.

When the image captured from the calibration images is received from the image capturing device 30, the corrected data calculator 123 of the video reproduction device 10 performs geometric correction on the calibration images in step S106.

FIGS. 9A and 9B are explanatory diagrams of a geometric process on the calibration image displayed on the display device 11 according to the present embodiment. As shown in FIGS. 9A and 9B, signals of the calibration image of the display device 11 are denoted by $R_{I1}$ to $R_{I4}$, $G_{I1}$ to $G_{I4}$, $B_{I1}$ to $B_{I4}$, and $W_{I1}$ to $W_{I4}$. When the operator captures the calibration image, the image is deformed from a relationship of an image capturing position of the camera. For example, it is assumed that an image captured from the calibration image of the display device 11 is deformed as shown in FIG. 9A. When an image captured from the calibration images is received from the image capturing device 30, the corrected data calculator 123 of the video reproduction device 10 performs geometric correction on the image captured from the calibration images deformed in the above-described way so that the captured image becomes a rectangular image having an aspect ratio of the original calibration image as shown in FIG. 9B.

FIGS. 10A and 10B are explanatory diagrams of geometric correction on the calibration image displayed on the screen 21 according to the present embodiment. As shown in FIGS. 10A and 10B, signals of the calibration image of the screen 21 are denoted by $R_{O1}$ to $R_{O4}$, $G_{O1}$ to $G_{O4}$, $B_{O1}$ to $B_{O4}$, and $W_{O1}$ to $W_{O4}$. It is assumed that an image captured from the calibration image of the screen 21 is deformed as shown in FIG. 10A. When an image captured from the calibration images is received from the image capturing device 30, the corrected data calculator 123 of the video reproduction device 10 performs geometric correction on the image captured from the calibration images deformed in the above-described way so that the captured image becomes a rectangular image having an aspect ratio of the original calibration image as shown in FIG. 9B.

As shown in FIGS. 9B and 10B, signals of each region can be extracted by geometrically correcting a captured image captured from the two calibration images by the image capturing device 30. When the geometric correction of the two calibration images ends, the corrected data calculator 123 extracts color signals of each region from the two calibration images geometrically corrected in the above-described way. Also, a white signal is converted into that of luminance Y. The corrected data calculator 123 calculates a tone curve by extracting a color component for each of all colors and grayscale regions.

Figure 11A:
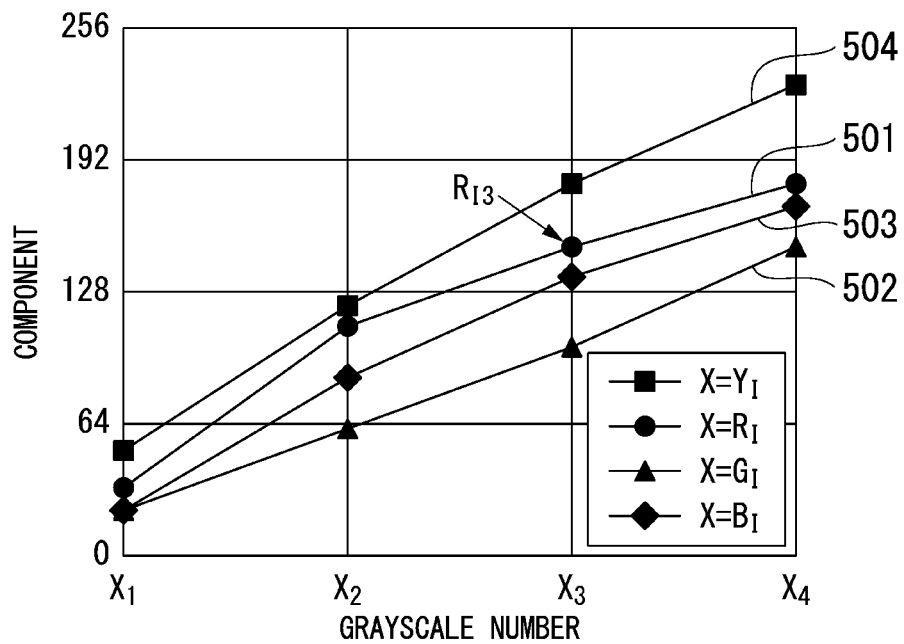
FIG. 11A is a graph showing a tone curve obtained from an image captured from a calibration image.
Figure 11B:
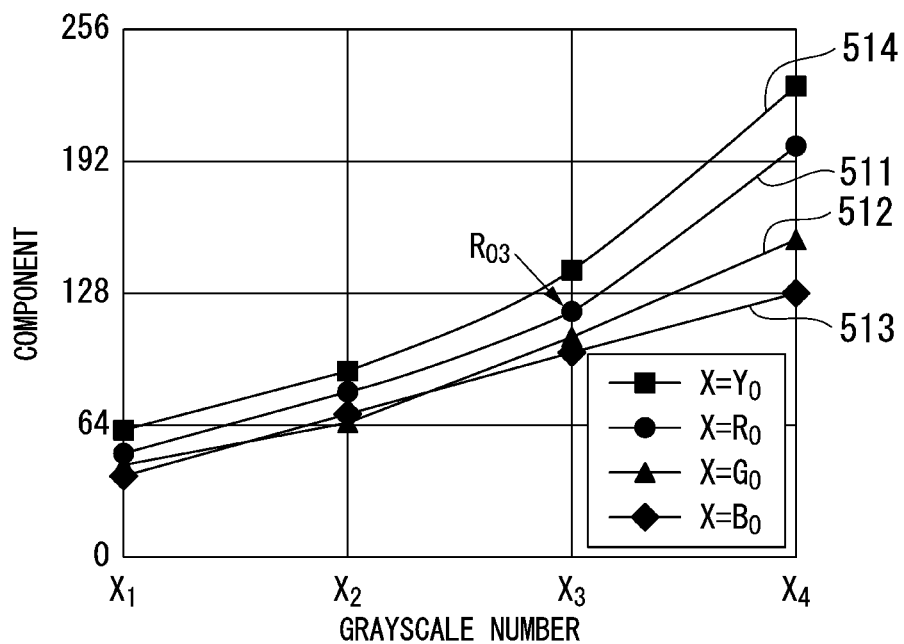
FIG. 11B is a graph showing a tone curve obtained from an image captured from a calibration image.

FIGS. 11A and 11B are graphs showing a tone curve obtained from the image captured from the calibration image in the present embodiment. In the graphs shown in FIGS. 11A and 11B, the horizontal axis represents the grayscale numbers X1, X2, X3, and X4 and the vertical axis represents a level of each component.

FIG. 11A is a tone curve calculated from an image captured from the calibration image of the display device 11. As shown in FIG. 9B, components of red signals $R_{I1}$, $R_{I2}$, $R_{I3}$, and $R_{I4}$ are extracted from the grayscale numbers X1, X2, X3, and X4 in the top row from the image captured from the calibration image of the display device 11. By plotting the components of the red signals $R_{I1}$, $R_{I2}$, $R_{I3}$, and $R_{I4}$, a red tone curve 501 can be obtained.

Components of the green signals $G_{I1}$, $G_{I2}$, $G_{I3}$, and $G_{I4}$ are extracted from the grayscale numbers X1, X2, X3, and X4 of the next row. By plotting the components of the green signals $G_{I1}$, $G_{I2}$, $G_{I3}$, and $G_{I4}$, a green tone curve 502 is obtained.

Blue signals $B_{I1}$, $B_{I2}$, $B_{I3}$, and $B_{I4}$ are extracted from the grayscale numbers X1, X2, X3, and X4 of the next row. By plotting components of the blue signals $B_{I1}$, $B_{I2}$, $B_{I3}$, and $B_{I4}$, a blue tone curve 503 can be obtained.

White signals $W_{I1}$, $W_{I2}$, $W_{I3}$, and $W_{I4}$ are extracted from the grayscale numbers X1, X2, X3, and X4 of the bottom row and luminances $Y_{I1}$, $Y_{I2}$, $Y_{I3}$, and $Y_{I4}$ are obtained. By plotting components of the luminances $Y_{I1}$, $Y_{I2}$, $Y_{I3}$, and $Y_{I4}$, a luminance tone curve 504 can be obtained.

FIG. 11B is a tone curve calculated from an image captured from the calibration image of the screen 21. Components of the red signals $R_{O1}$, $R_{O2}$, $R_{O3}$, and $R_{O4}$ are extracted from the grayscale numbers X1, X2, X3, and X4 of the top row from the image captured from the calibration image of the screen 21. By plotting the components of the red signals $R_{O1}$, $R_{O2}$, $R_{O3}$, and $R_{O4}$, a red tone curve 511 can be obtained.

Components of the green signals $G_{O1}$, $G_{O2}$, $G_{O3}$, and $G_{O4}$ are extracted from the grayscale numbers X1, X2, X3, and X4 of the next row. By plotting the components of the green signals $G_{O1}$, $G_{O2}$, $G_{O3}$, and $G_{O4}$, a green tone curve 512 can be obtained.

Blue signals $B_{O1}$, $B_{O2}$, $B_{O3}$, and $B_{O4}$ are extracted from the grayscale numbers X1, X2, X3, and X4 of the next row. By plotting components of the blue signals $B_{O1}$, $B_{O2}$, $B_{O3}$, and $B_{O4}$, a blue tone curve 513 can be obtained.

White signals $W_{O1}$, $W_{O2}$, $W_{O3}$, and $W_{O4}$ are extracted from the grayscale numbers X1, X2, X3, and X4 of the bottom row and the luminances $Y_{O1}$, $Y_{O2}$, $Y_{O3}$, and $Y_{O4}$ are obtained. By plotting components of the luminances $Y_{O1}$, $Y_{O2}$, $Y_{O3}$, and $Y_{O4}$, a luminance tone curve 514 can be obtained.

By comparing the tone curve shown in FIG. 11A with the tone curve shown in FIG. 11B, a characteristic difference between the display device 11 of the video reproduction device 10 and the video display device 20 can be understood. If corrected data is generated so that a characteristic difference is corrected, a difference between the display color of the display device 11 and the display color of the screen 21 can be corrected.

In step S107, the corrected data calculator 123 generates corrected data so that the two tone curves match. That is, when a level $R_{I3}$ of the grayscale number X3 of the red tone curve 501 shown in FIG. 11A is compared with a level $R_{O3}$ of the corresponding grayscale number X3 of the red tone curve 511 shown in FIG. 11B, it can be seen that the red level $R_{O3}$ of the screen 21 is lower than the red level $R_{I3}$ of the display device 11. Therefore, the corrected data calculator 123 generates corrected data for increasing a component of $R_{f3}$ of the video signal which is output to the video display device 20 so that the red level $R_{O3}$ of the screen 21 is similar to the red level $R_{f3}$ of the display device 11 in consideration of a difference between the luminance $Y_{f3}$ and the luminance $Y_{O3}$. A similar process is performed with respect to all R, G, B and grayscale numbers and components of video signals which are output to the video display device 20 are corrected.

As described above, in the present embodiment, a display color difference between the video displayed on the display device 11 of the video reproduction device 10 and the video displayed on the screen 21 of the video display device 20 can be corrected.

Figure 12:
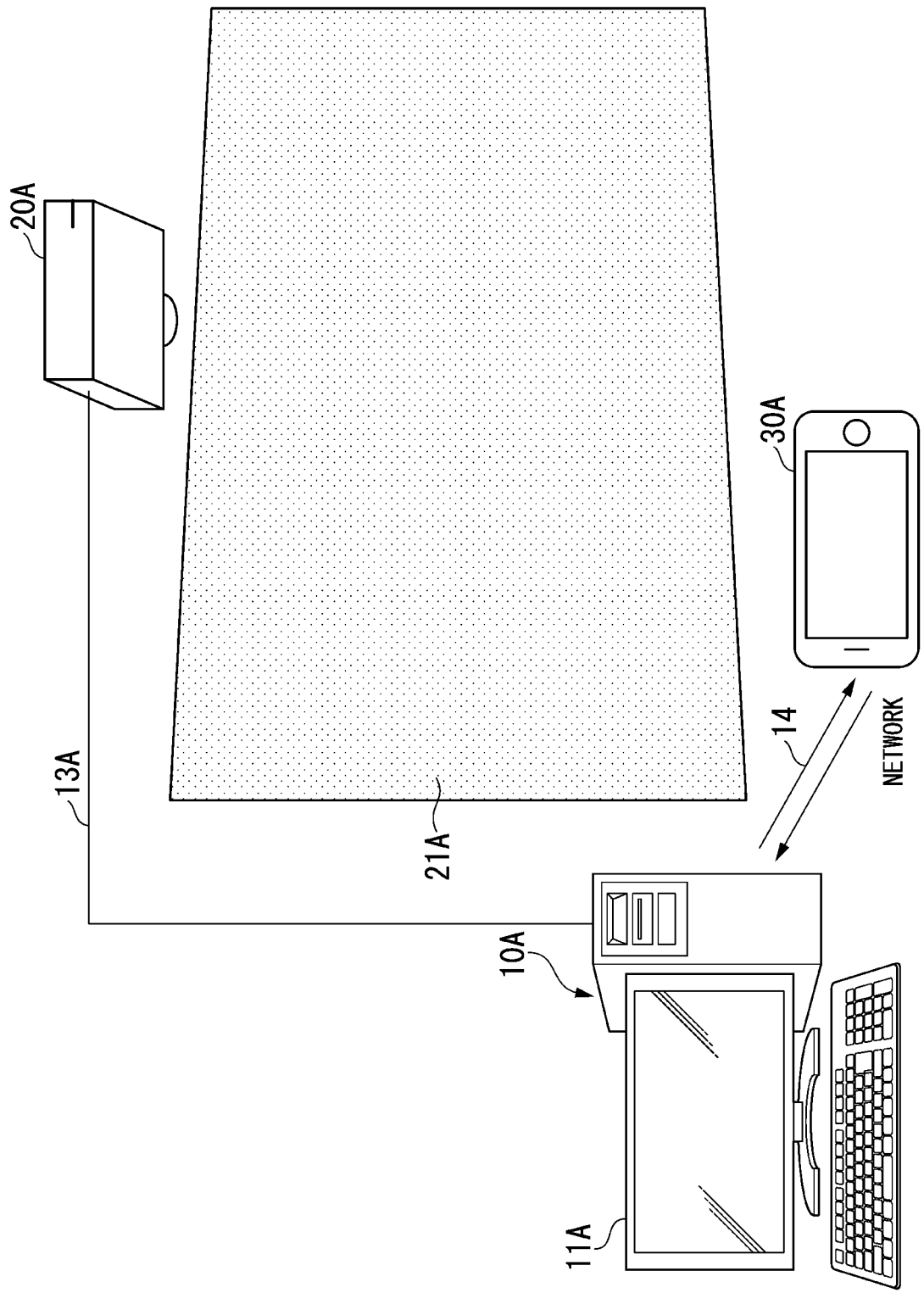
FIG. 12 is a schematic block diagram showing a configuration of a video reproduction system according to a second embodiment.

FIG. 12 is a diagram showing a schematic configuration of a video reproduction system according to the second embodiment.

Although a difference from the video reproduction system according to the first embodiment in FIG. 12 is that the video reproduction device 10 according to the first embodiment includes the display device 11 and the video reproduction device 10A according to the second embodiment does not include the display device and is externally connected to a display device 11A instead of the display device. That is, the display device may be externally connected to the video reproduction device 10A.

A video display device 20A, a screen 21A, and an image capturing device 30A in the video reproduction system according to the second embodiment correspond to the video display device 20, the screen 21, and the image capturing device 30 of the video reproduction system according to the first embodiment, respectively.

Because a configuration of the video reproduction system according to the second embodiment is similar to the configuration of the video reproduction system according to the first embodiment, except for a configuration in which the display device is connected outside of the video reproduction device 10A as described above, description thereof will be omitted.

Figure 13:
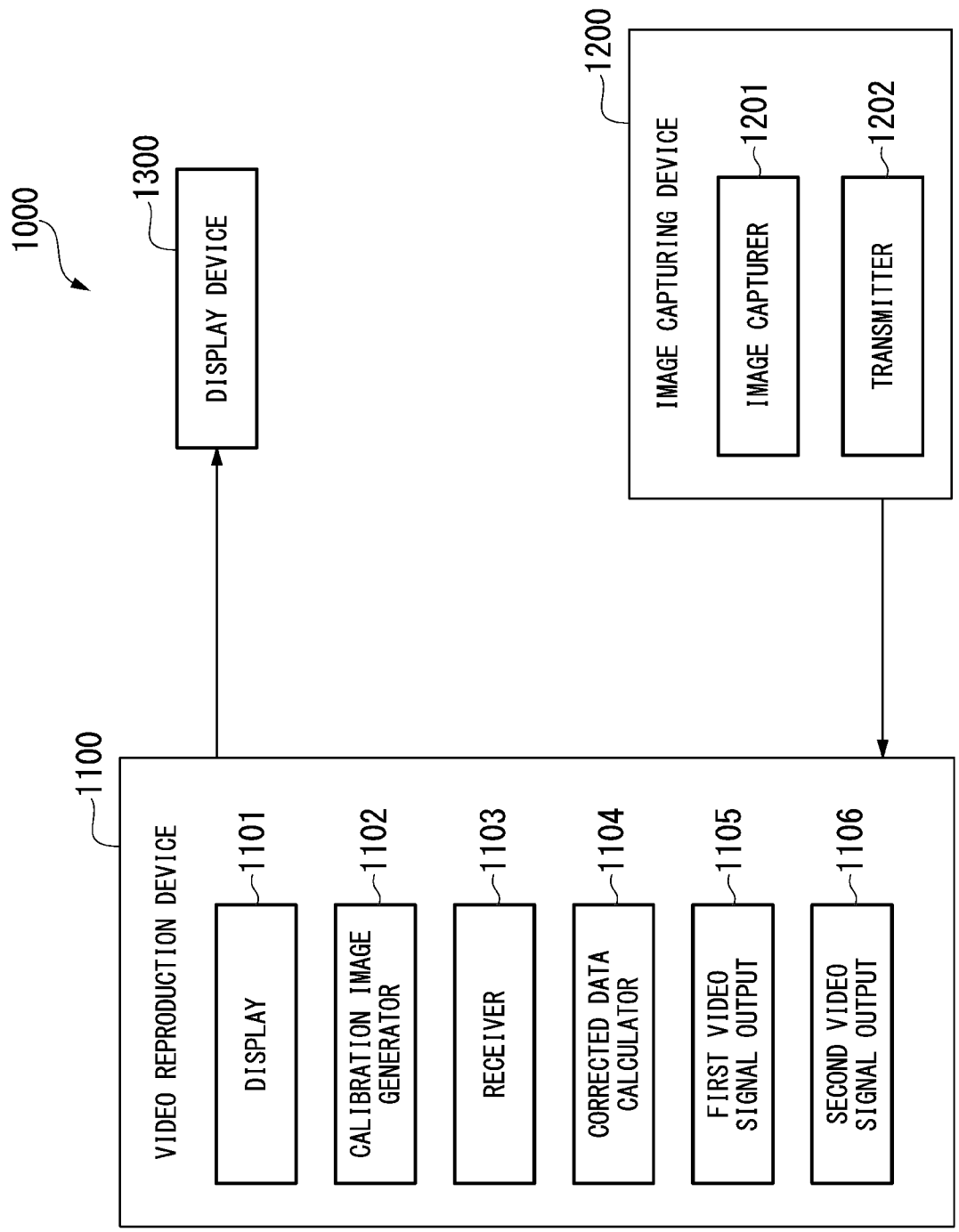
FIG. 13 is a schematic block diagram showing a configuration of a video reproduction system according to a third embodiment.

FIG. 13 is a schematic block diagram showing a configuration of a video reproduction system according to the third embodiment of the present invention. That is, a video reproduction system 1000 according to the present invention may include a video reproduction device 1100 and an image capturing device 1200 and a display device 1300 may be connected to the video reproduction device 1100.

In the video reproduction device 1100, a calibration image generator 1102 generates calibration images to be displayed on the display provided in the video reproduction device and the display device connected outside of the video reproduction device. A receiver 1103 receives captured images obtained by capturing the calibration image displayed on a display 1101 and the calibration image displayed on the display device 1300 from the image capturing device. A corrected data calculator 1104 calculates color-component-corrected data from a color component difference between the calibration image displayed on the display 1101 and the calibration image displayed by the display device 1300 included in the captured images. A first video signal output 1105 outputs a target video signal to be reproduced to the display. A second video signal output 1106 performs color correction on the video signal which is output from the first video signal output 1150 to the display 1101 with the corrected data obtained by the corrected data calculator 1104 and outputs a color-corrected video signal to the display device 1300.

In the image capturing device 1200, an image capturer 1201 performs image capturing in an image capturing range that includes at least the calibration image displayed by the display 1101 and the calibration image displayed by the display device 1300. A transmitter 1202 transmits the captured image to the video reproduction device 1100.

Although a case in which the calibration image is transmitted from the image capturing device 30 to the video reproduction device 10 has been described in the above-described embodiment, information generated on the basis of a captured image obtained by capturing the calibration image may be transmitted. For example, the image capturing device 30 may extract a region of the calibration image from the captured image and transmit an image of the extracted region to the video reproduction device 10. Also, the image capturing device 30 may perform geometric correction on the calibration image included in the captured image and then transmit a geometric correction result to the video reproduction device 10 or may calculate color-corrected data after the geometric correction is performed and transmit the calculated color-corrected data to the video reproduction device 10.

<Additional Notes>

Also, aspects of the invention according to the above-described embodiments can be understood as follows.

(1) According to an aspect of the present invention, there is provided a video reproduction system including at least a video reproduction device; and a display device connected to the video reproduction device, wherein the video reproduction device includes:

a display;

a calibration image generator configured to generate calibration images to be displayed by the display and the display device;

a receiver configured to receive a captured image in which the calibration image displayed by the display and the calibration image displayed by the display device are captured or information generated on the basis of the captured image;

a corrected data calculator configured to calculate color-component-corrected data from a color component difference between the calibration image displayed by the display and the calibration image displayed by the display device;

a first video signal output configured to output a video signal to the display; and a second video signal output configured to perform color correction on a video signal representing the same video as the video signal that is output to the display according to the corrected data obtained by the corrected data calculator and output a color-corrected video signal to the display device, and wherein the display device displays a video based on the color-corrected video signal.

(2) According to an aspect of the present invention, there is provided a video reproduction system including at least a video reproduction device; a first display device; and a second display device, wherein the video reproduction device includes a calibration image generator configured to generate calibration images to be displayed by the first display device and the second display device;

a receiver configured to receive a captured image in which the calibration image displayed by the first display device and the calibration image displayed by the second display device are captured or information generated on the basis of the captured image;

a corrected data calculator configured to calculate color-component-corrected data from a color component difference between the calibration image displayed by the first display device and the calibration image displayed by the second display device;

a first video signal output configured to output a video signal to the first display device; and a second video signal output configured to perform color correction on a video signal representing the same video as the video signal that is output to the first display device according to the corrected data obtained by the corrected data calculator and output a color-corrected video signal to the second display device, and wherein the second display device displays a video based on the color-corrected video signal.

(3) According to an aspect of the present invention, there is provided a video reproduction device for use in a video reproduction system including at least the video reproduction device and a display device connected to the video reproduction device, the video reproduction device including:

a display;

a calibration image generator configured to generate calibration images to be displayed by the display provided in the video reproduction device and the display device connected outside of the video reproduction device;

a receiver configured to receive a captured image in which the calibration image displayed by the display and the calibration image displayed by the display device are captured or information generated on the basis of the captured image from an image capturing device;

a corrected data calculator configured to calculate color-component-corrected data from a color component difference between the calibration image displayed by the display and the calibration image displayed by the display device included in the captured image;

a first video signal output configured to output a target video signal to be reproduced to the display; and a second video signal output configured to perform color correction on a video signal representing the same video as the video signal that is output from the first video signal output to the display according to the corrected data obtained by the corrected data calculator and output a color-corrected video signal to the display device, wherein the display device displays a video based on the color-corrected video signal.

(4) According to an aspect of the present invention, there is provided an image capturing device capable of being used in a video reproduction system including at least a video reproduction device and a display device connected to the video reproduction device, the image capturing device including:

an image capturer configured to perform image capturing in an image capturing range including at least a calibration image displayed by a display provided in the video reproduction device and a calibration image displayed by the display device; and a transmitter configured to transmit a captured image to the video reproduction device that outputs a video signal to the display and outputs a video signal corrected according to corrected data based on a color component difference between the calibration image displayed by the display and the calibration image displayed by the display device to the display device.

(5) According to an aspect of the present invention, there is provided a calibration method for use in a video reproduction device in a video reproduction system including at least the video reproduction device and a display device connected to the video reproduction device, the calibration method including:

generating, by the video reproduction device, calibration images to be displayed by the display provided in the video reproduction device and the display device;

receiving, by the video reproduction device, a captured image in which the calibration image displayed by the display and the calibration image displayed by the display device are captured or information generated on the basis of the captured image from an image capturing device;

calculating, by the video reproduction device, color-component-corrected data from a color component difference between the calibration image displayed by the display and the calibration image displayed by the display device;

outputting a video signal to the display;

performing, by the video reproduction device, color correction on a video signal representing the same video as the video signal that is output to the display according to the corrected data obtained by the corrected data calculator and outputting a color-corrected video signal to the display device, and displaying, by the display device, a video based on the color-corrected video signal.

(6) According to an aspect of the present invention, there is provided a captured image supply method for use in an image capturing device capable of being used in a video reproduction system including at least the video reproduction device and a display device connected to the video reproduction device, the captured image supply method comprising:

generating a captured image by performing image capturing in an image capturing range including at least a calibration image displayed by a display provided in the video reproduction device and a calibration image displayed by the display device; and transmitting the captured image to the video reproduction device that outputs a video signal to the display and outputs a video signal corrected according to corrected data based on a color component difference between the calibration image displayed by the display and the calibration image displayed by the display device to the display device.

(7) An aspect of the present invention can be understood as a video reproduction method for use in a video reproduction system. That is, there is provided a video reproduction method for use in a video reproduction system including at least a video reproduction device, a display device, and an image capturing device, the video reproduction method including:

generating, by the video reproduction device, calibration images to be displayed by the display provided in the video reproduction device and the display device;

performing, by the image capturing device, image capturing in an image capturing range including at least a calibration image displayed by the display and a calibration image displayed by the display device;

transmitting, by the image capturing device, a captured image to the video reproduction device;

receiving, by the video reproduction device, a captured image in which the calibration image displayed by the display and the calibration image displayed by the display device are captured or information generated on the basis of the captured image from the image capturing device;

calculating, by the video reproduction device, color-component-corrected data from a color component difference between the calibration image displayed by the display and the calibration image displayed by the display device;

outputting, by the video reproduction device, a video signal to the display;

performing, by the video reproduction device, color correction on a video signal representing the same video as the video signal that is output to the display according to the corrected data and outputting a color-corrected video signal to the display device; and displaying, by the display device, a video based on the color-corrected video signal.

(8) According to an aspect of the present invention, there is provided a video reproduction method for use in a video reproduction system including at least a video reproduction device, a display device, and an image capturing device, the video reproduction method including:

generating, by the video reproduction device, calibration images to be displayed by a first display device and a second display device;

performing, by the image capturing device, image capturing in an image capturing range including at least the calibration image displayed by the first display device and the calibration image displayed by the second display device;

transmitting, by the image capturing device, a captured image to the video reproduction device;

receiving, by the video reproduction device, a captured image in which the calibration image displayed by the first display device and the calibration image displayed by the second display device are captured or information generated on the basis of the captured image from the image capturing device;

calculating, by the video reproduction device, color-component-corrected data from a color component difference between the calibration image displayed by the first display device and the calibration image displayed by the second display device;

outputting, by the video reproduction device, a video signal to the first display device;

performing, by the video reproduction device, color correction on a video signal representing the same video as the video signal that is output to the first display device according to the corrected data obtained by the corrected data calculator and output a color-corrected video signal to the second display device; and displaying, by the second display device, a video based on the color-corrected video signal.

(9) An aspect of the present invention can be understood as a program for causing a computer used as a video reproduction device to execute steps. That is, there is provided a program for causing a computer of a video reproduction device for use in a video reproduction system including at least the video reproduction device having a display and a display device connected to the video reproduction device to execute steps of:

generating calibration images to be displayed by the display and the display device;

receiving a captured image in which the calibration image displayed by the display and the calibration image displayed by the display device are captured or information generated on the basis of the captured image from an image capturing device;

calculating color-component-corrected data from a color component difference between the calibration image displayed by the display and the calibration image displayed by the display device included in the captured image;

outputting a target video signal to be reproduced to the display; and performing color correction on the video signal to be output to the display according to the corrected data and outputting a color-corrected video signal to the display device.

(10) An aspect of the present invention can be understood as an image capturing method for use in an image capturing device. That is, there is provided an image capturing method for use in an image capturing device capable of being used in a video reproduction system including at least a video reproduction device including a display and a display device connected to the video reproduction device, the image capturing method including:

performing image capturing in an image capturing range including at least a calibration image displayed by the display and a calibration image displayed by the display device; and transmitting a captured image to the video reproduction device that outputs a video signal to the display and outputs a video signal corrected according to corrected data based on a color component difference between the calibration image displayed by the display and the calibration image displayed by the display device to the display device.

(11) An aspect of the present invention can be understood as a program for causing a computer used as an image capturing device to execute steps. That is, there is provided a program for causing a computer of an image capturing device for use in a video reproduction system including at least a video reproduction device having a display and a display device connected to the video reproduction device to execute steps of:

performing image capturing in an image capturing range including at least a calibration image displayed by the display and a calibration image displayed by the display device; and transmitting a captured image to the video reproduction device that outputs a video signal to the display and outputs a video signal corrected according to corrected data based on a color component difference between the calibration image displayed by the display and the calibration image displayed by the display device to the display device.

Also, all or a part of the video reproduction system 1 or 1000 of the above-described embodiments may be implemented by a computer. In this case, functions of all or a part of the above-described video reproduction system 1 or 1000 may be implemented by recording a program for implementing the functions in a computer-readable recording medium and causing a computer system to read and execute the above-described program recorded in the recording medium. Also, the "computer system" described here is assumed to include an operating system (OS) and hardware such as peripheral devices. Here, the "computer-readable recording medium" refers to a storage device including a flexible disk, a magneto-optical disc, a ROM, a portable medium such as a compact disc (CD)-ROM, and a hard disk embedded in the computer system. Further, the "computer-readable recording medium" is assumed to include a computer-readable recording medium for dynamically retaining a program for a short time as in a communication line when the program is transmitted via a network such as the Internet or a communication circuit such as a telephone circuit and a computer-readable recording medium for retaining the program for a given time period as in a volatile memory inside the computer system including a server and a client when the program is transmitted. Also, the above-described program may be a program for implementing some of the above-described functions. Further, the above-described program may be a program capable of implementing the above-described functions in combination with a program already recorded on the computer system or may be a program that is implemented using a programmable logic device such as an FPGA.

Although embodiments of the present invention have been described above with reference to the drawings, specific configurations are not limited to the embodiments, and other designs and the like may also be included without departing from the scope of the present invention.

REFERENCE SIGNS LIST

10 Video reproduction device
11 Display device
30 Image capturing device
101 Video corrector
120 Image processing controller
123 Corrected data calculator
130 Display

The invention claimed is:

1. A video reproduction system comprising at least:
a video reproduction device; and
a display device connected to the video reproduction device,
wherein the video reproduction device comprises:
a display;
a calibration image generator configured to generate calibration images to be displayed by the display and the display device;
a receiver configured to receive a captured image in which the calibration image displayed by the display and the calibration image displayed by the display device are captured or information generated on the basis of the captured image;
a corrected data calculator configured to calculate color-component-corrected data from a color component difference between the calibration image displayed by the display and the calibration image displayed by the display device;
a first video signal output configured to output a video signal to the display; and
a second video signal output configured to perform color correction on a video signal representing the same video as the video signal that is output to the display according to the corrected data obtained by the corrected data calculator and output a color-corrected video signal to the display device, and
wherein the display device displays a video based on the color-corrected video signal.

2. A video reproduction system comprising at least:
a video reproduction device;
a first display device; and
a second display device,
wherein the video reproduction device comprises:
a calibration image generator configured to generate calibration images to be displayed by the first display device and the second display device;
a receiver configured to receive a captured image in which the calibration image displayed by the first display device and the calibration image displayed by the second display device are captured or information generated on the basis of the captured image;
a corrected data calculator configured to calculate color-component-corrected data from a color component difference between the calibration image displayed by the first display device and the calibration image displayed by the second display device;
a first video signal output configured to output a video signal to the first display device; and
a second video signal output configured to perform color correction on a video signal representing the same video as the video signal that is output to the first display device according to the corrected data obtained by the corrected data calculator and output a color-corrected video signal to the second display device, and
wherein the second display device displays a video based on the color-corrected video signal.

3. The video reproduction system according to claim 1, wherein the calibration image includes an image of colors having different grayscales.

4. The video reproduction system according to claim 1, wherein, after each of the generated calibration images included in the captured image is geometrically corrected, the corrected data calculator extracts a signal of each color and generates corrected data of each color.

5. The video reproduction system according to claim 1, wherein, when a calibration start request is acquired, the video reproduction device switches display from the video signal to the calibration image.

6. The video reproduction system according to claim 1, wherein the captured image is an image in which the calibration image displayed by the display and the calibration image displayed by the display device are captured within one image capturing region.

7. The video reproduction system according to claim 2, wherein the captured image is an image in which the calibration image displayed by the first display device and the calibration image displayed by the second display device are captured within one image capturing region.

8. A video reproduction device for use in a video reproduction system comprising at least the video reproduction device and a display device connected to the video reproduction device, the video reproduction device comprising:
a display;
a calibration image generator configured to generate calibration images to be displayed by the display and the display device connected outside of the video reproduction device;
a receiver configured to receive a captured image in which the calibration image displayed by the display and the calibration image displayed by the display device are captured or information generated on the basis of the captured image from an image capturing device;
a corrected data calculator configured to calculate color-component-corrected data from a color component difference between the calibration image displayed by the display and the calibration image displayed by the display device included in the captured image;
a first video signal output configured to output a target video signal to be reproduced to the display; and
a second video signal output configured to perform color correction on the video signal to be output from the first video signal output to the display according to the corrected data obtained by the corrected data calculator and output a color-corrected video signal to the display device,
wherein the display device displays a video based on the color-corrected video signal.

9. An image capturing device capable of being used in a video reproduction system comprising at least a video reproduction device and a display device connected to the video reproduction device, the image capturing device comprising:

an image capturer configured to perform image capturing in an image capturing range including at least a calibration image displayed by a display provided in the video reproduction device and a calibration image displayed by the display device; and a transmitter configured to transmit a captured image to the video reproduction device that outputs a video signal to the display and outputs a video signal corrected according to corrected data based on a color component difference between the calibration image displayed by the display and the calibration image displayed by the display device to the display device.

10. A calibration method for use in a video reproduction device in a video reproduction system comprising at least the video reproduction device and a display device connected to the video reproduction device, the calibration method comprising:

generating, by the video reproduction device, calibration images to be displayed by the display provided in the video reproduction device and the display device;

receiving, by the video reproduction device, a captured image in which the calibration image displayed by the display and the calibration image displayed by the display device are captured or information generated on the basis of the captured image from an image capturing device;

calculating, by the video reproduction device, color-component-corrected data from a color component difference between the calibration image displayed by the display and the calibration image displayed by the display device;

outputting a video signal to the display;

performing, by the video reproduction device, color correction on a video signal representing the same video as the video signal that is output to the display according to the corrected data obtained by the corrected data calculator and outputting a color-corrected video signal to the display device, and displaying, by the display device, a video based on the color-corrected video signal.

11. A captured image supply method for use in an image capturing device capable of being used in a video reproduction system comprising at least a video reproduction device and a display device connected to the video reproduction device, the captured image supply method comprising:

generating a captured image by performing image capturing in an image capturing range including at least a calibration image displayed by a display provided in the video reproduction device and a calibration image displayed by the display device; and transmitting the captured image to the video reproduction device that outputs a video signal to the display and outputs a video signal corrected according to corrected data based on a color component difference between the calibration image displayed by the display and the calibration image displayed by the display device to the display device.

12. The video reproduction system according to claim 1, wherein the color correction on the video signal is performed after a calibration is performed.

13. The video reproduction system according to claim 1, wherein the video signal does not indicate the calibration image.

14. The video reproduction system according to claim 1, wherein the display of the video reproduction device includes a second display device, wherein when a calibration operation is performed, the generated calibration images are displayed on the display of the video reproduction device and the display device, wherein the video reproduction device extracts images captured from at least two calibration images transmitted from the image capturing device to perform color correction, the two calibration images comprising the calibration image displayed by the display of the video reproduction device and the calibration image displayed by the display device, and wherein the display device displays the video based on the color-corrected video signal by the video reproduction device.

15. The video reproduction system according to claim 8, wherein the color correction on the video signal is performed after a calibration is performed.

16. The video reproduction system according to claim 8, wherein the video signal does not indicate the calibration image.

17. The image capturing device according to claim 9, wherein the color correction on the video signal is performed after a calibration is performed, or wherein the video signal does not indicate the calibration image.

18. The calibration method according to claim 10, wherein the color correction on the video signal is performed after a calibration is performed.

19. The calibration method according to claim 10, wherein the video signal does not indicate the calibration image.

20. The captured image supply method according to claim 11, wherein the color correction on the video signal is performed after a calibration is performed or wherein the video signal does not indicate the calibration image.

* * * * *